United States Patent

[11] 3,620,352

[72] Inventors William H. Gilgore;
 Carey L. Shirey, both of York, Pa.
[21] Appl. No. 67,384
[22] Filed Aug. 27, 1970
[45] Patented Nov. 16, 1971
[73] Assignee Teledyne, Inc.
 York, Pa.

[54] RACK-TYPE DOUGH PROOFER
 14 Claims, 15 Drawing Figs.
[52] U.S. Cl. .................................................. 198/138,
 214/16.4
[51] Int. Cl. ........................................................ B65g 17/16
[50] Field of Search ........................................... 198/24, 85,
 138, 158; 214/16.4

[56] References Cited
 UNITED STATES PATENTS
 3,053,375 9/1962 Temple ......................... 198/24
 3,266,616 8/1966 Thomas et al. ................ 214/16.4 X
 3,297,176 1/1967 Temple ......................... 214/16.4
 3,349,928 10/1967 Howard ........................ 214/16.4

Primary Examiner—Evon C. Blunk
Assistant Examiner—Alfred N. Goodman
Attorney—Shoemaker and Mattare ABSTRACT: A rack-type dough proofer of the type shown in D. F. Howard U.S. Pat. No. 3,349,928 in which racks having a plurality of vertically equidistantly spaced shelves are moved in a closed circuit, including an elevator for raising successive racks passed a pan loading and unloading station, a rack-lowering conveyor, a rack-advancing conveyor delivering successive racks to the elevator and a rack-discharging conveyor for removing successive racks from the elevator. The rack elevating, lowering, advancing and discharging conveyors include chains driven continuously from a single motor in timed relation. The rack-advancing conveyor includes rack-engaging elements connected to the continuously operating rack-advancing conveyor chains for moving successive racks into position to be engaged by rack-engaging elements connected to the continuously operating elevator conveyor chains, the rack-engaging elements of the rack advance conveyor chains being arranged to hold the racks stationary in such position for a sufficient length of time to be picked up by a rack-engaging element of the elevator conveyor chain. The rack advance conveyor slopes upwardly from a point at which a rack-engaging element of the rack advance conveyor chain engages a rack at an angle such that as a rack moves along such slope it travels through a horizontal distance to bring it in vertical alignment with a preceding rack being elevated by the elevating conveyor in the same time that it travels a vertical distance equal to a rack shelf space, or preferably a somewhat greater distance than a rack shelf, so that the rack arrives in position to be picked up by the elevating conveyor somewhat prior to the arrival of the rack-engaging element of the rack-elevating conveyor chain, to provide a certain amount of tolerance.

INVENTORS
WILLIAM H. GILGORE
CAREY L. SHIREY
BY Otto Moeller

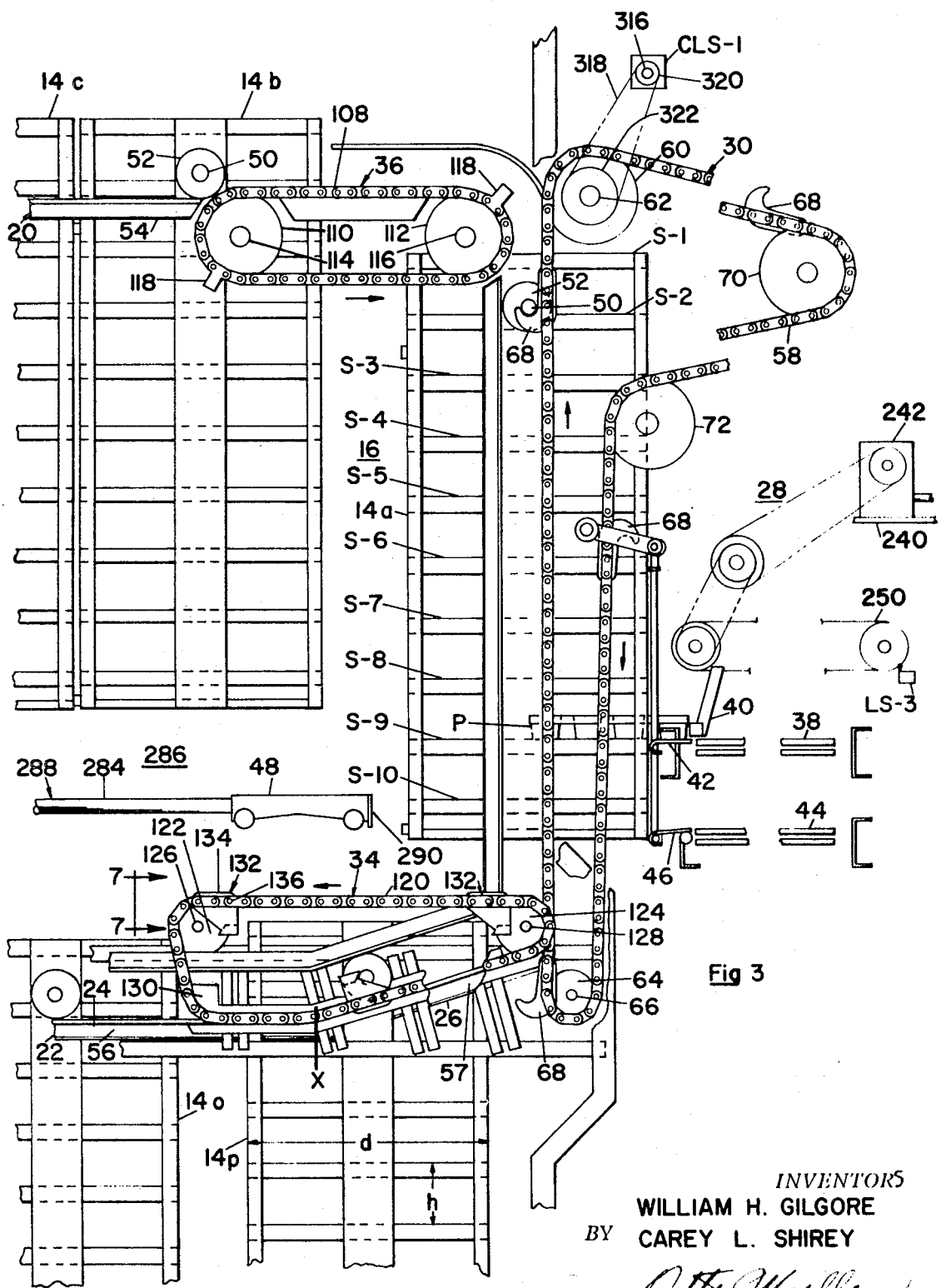

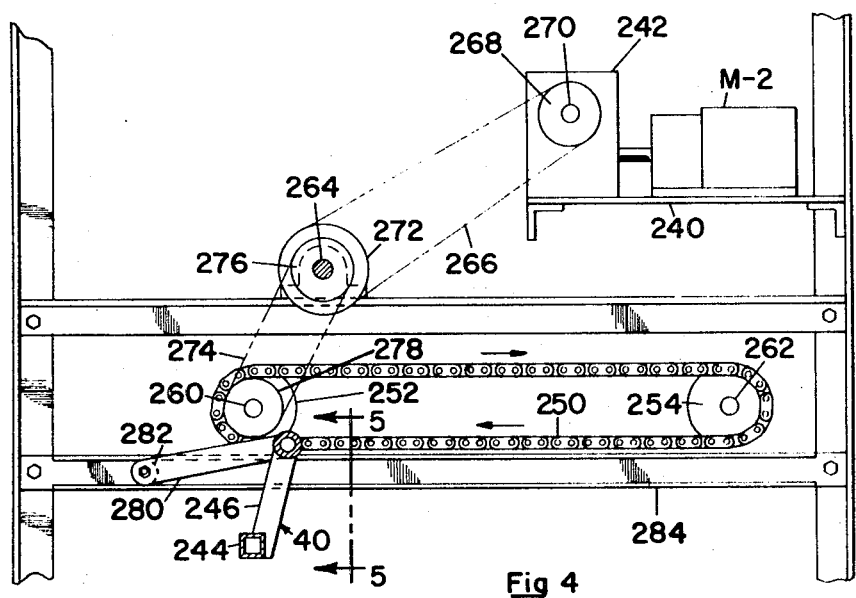
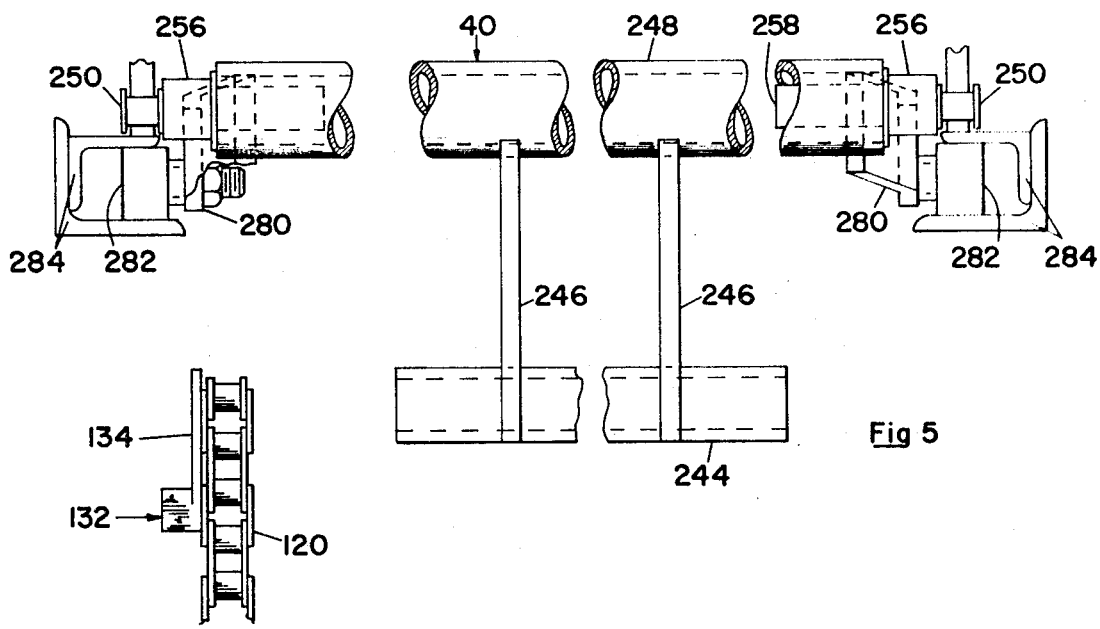
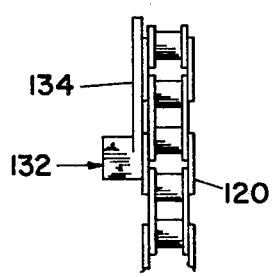
INVENTOR.
WILLIAM H. GILGORE
BY CAREY L. SHIREY

INVENTORS
WILLIAM H. GILGORE
BY CAREY L. SHIREY

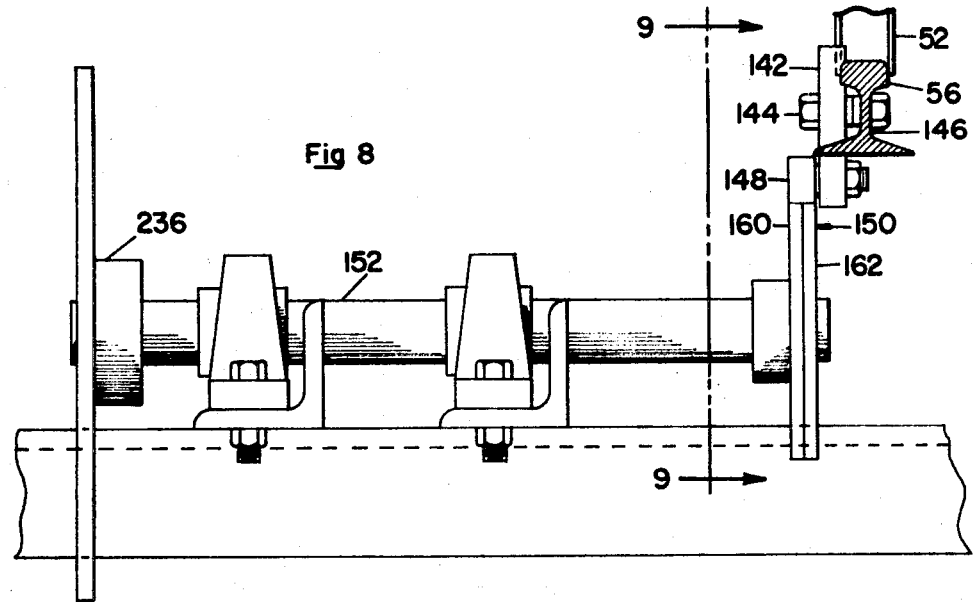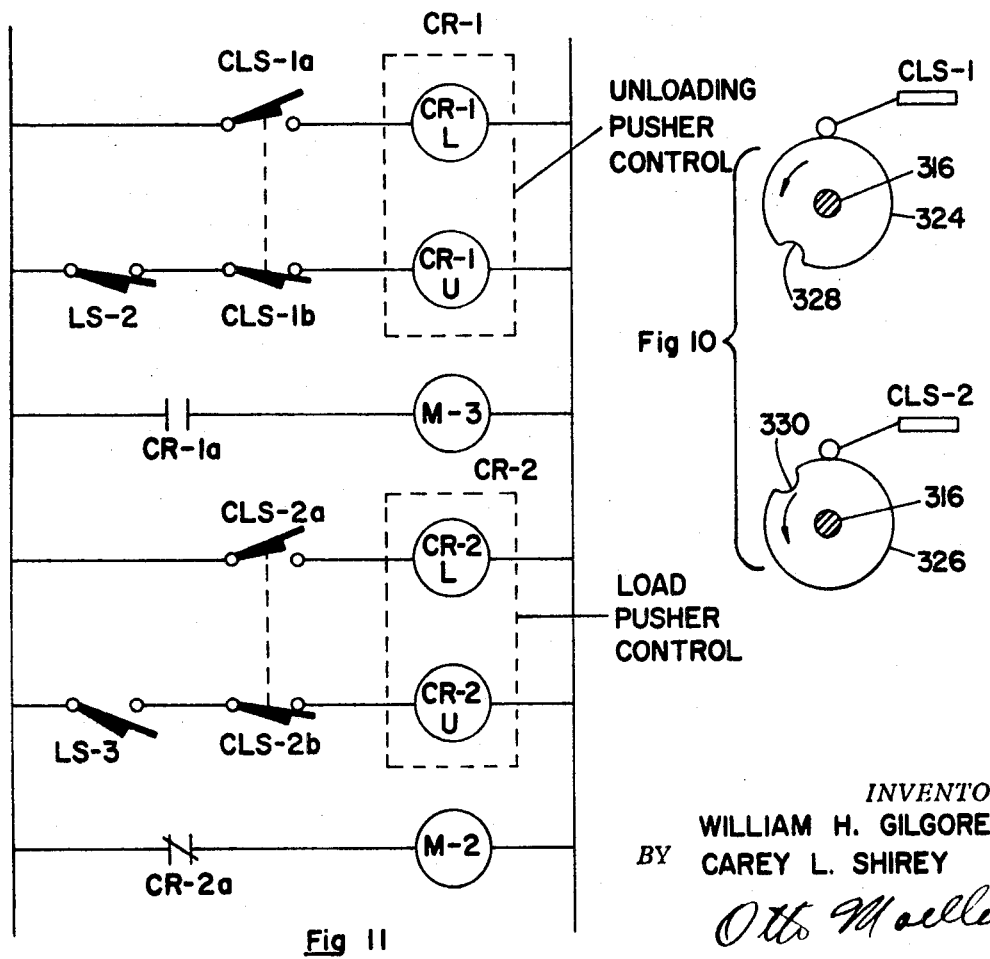

RACK-TYPE DOUGH PROOFER

BACKGROUND AND SUMMARY OF THE INVENTION

This invention relates to product-conditioning apparatus and more particularly to dough proofers of the type in which successive rows of pans of dough are charged onto vertically spaced shelves of racks, and which racks are movable in a closed loop through the proofing chamber to a point of discharge of the pans of proofed dough.

The closed rack-conducting loop customarily includes horizontal longitudinally extending upper and lower tracks on which the racks are pendently supported and along which contiguous racks are adapted to be pushed; elevating means for engaging successive racks through a loading and unloading station and releasing them on the upper tracks to push the row of contiguous racks ahead; and lowering means for engaging and lowering successive racks and releasing them on the lower tracks to push the row of contiguous racks ahead. In such apparatus it is customary to provide a rack-advancing conveyor along the forward end portion of the lower tracks adjacent the lower end of the rack-elevating conveyor whereby successive racks are advanced by the rack-advancing conveyor into position to be picked by the rack-elevating conveyor so that the top shelf of each successive rack is spaced a shelf space from the bottom shelf of a preceding rack being elevated through the loading and unloading station. The back to front dimension of a rack is considerably greater than a rack shelf spacing, for example as much as four or more times as great, so that a terminal rack on the lower tracks cannot move beneath a preceding rack until that preceding rack has been elevated sufficiently so that its lower end will clear the upper end of the terminal rack which is to be moved to the elevator. It is apparent then that the rack advance conveyor must operate at a considerably greater speed than the elevating conveyor to move a terminal rack into position to be picked up by the elevating conveyor. At this point in the travel of a rack through the proofer, the dough in the pans carried by the rack has about completed its proof and is sensitive to shock caused by excessive speed of the advance conveyor upon engagement with and advancement of a rack to the elevator, causing collapse of the dough and resulting in the production of an unsalable end product. The apparatus of the present invention minimizes such shortcomings and disadvantages of prior art proofers.

In addition in such prior art proofers, as described above, where separate motors have been employed for the rack advance conveyor and the rack-elevating conveyor, problems in timing and retaining them in timed relation have been incurred, and in such prior art proofers employing a single motor, complicated and cumbersome mechanism has been employed in conjunction with the elevating conveyor or the rack advance conveyor. The apparatus of the present invention minimizes or eliminates such shortcomings and disadvantages of prior art proofers, providing a single motor and simple, inexpensive mechanical means synchronizing the operation of the rack advance conveyor and the elevating conveyor.

The invention also provides means preventing uncontrolled coasting of the racks, in particular the terminal rack on the lower tracks, as the racks are pushed ahead, and to release the racks at the proper time to permit the terminal rack to be engaged by the rack-advancing conveyor for advancement to the elevating conveyor.

Other objects and advantages will become apparent and the invention will be better understood from the following description of the preferred embodiment illustrated in the accompanying drawings. While the invention is hereinafter described with particular reference to a dough proofer, it is readily apparent that with obvious alterations, the invention is capable of use as a bread cooler, or for treatment of other products in a treating chamber.

In the drawings:

FIG. 3 is a sectional view taken along the line 3—3 of FIG. 2;

FIG. 4 is a longitudinal central vertical sectional view of the pan-loading pusher;

FIG. 5 is a sectional view taken on the line 5—5 of FIG. 4;

FIG. 7 is a sectional view taken on the line 7—7 of FIG. 3 showing the rack pusher of the track advance conveyor;

FIG. 8 is a sectional view taken on the line 8—8 of FIG. 1 showing the rack-latching means for stopping and releasing a rack;

FIG. 10 is a diagrammatic view of the cam control means for the unloading and loading pushers; and FIG. 11 is an electrical wiring diagram of the unloading and loading pusher control means.

Figure 1:
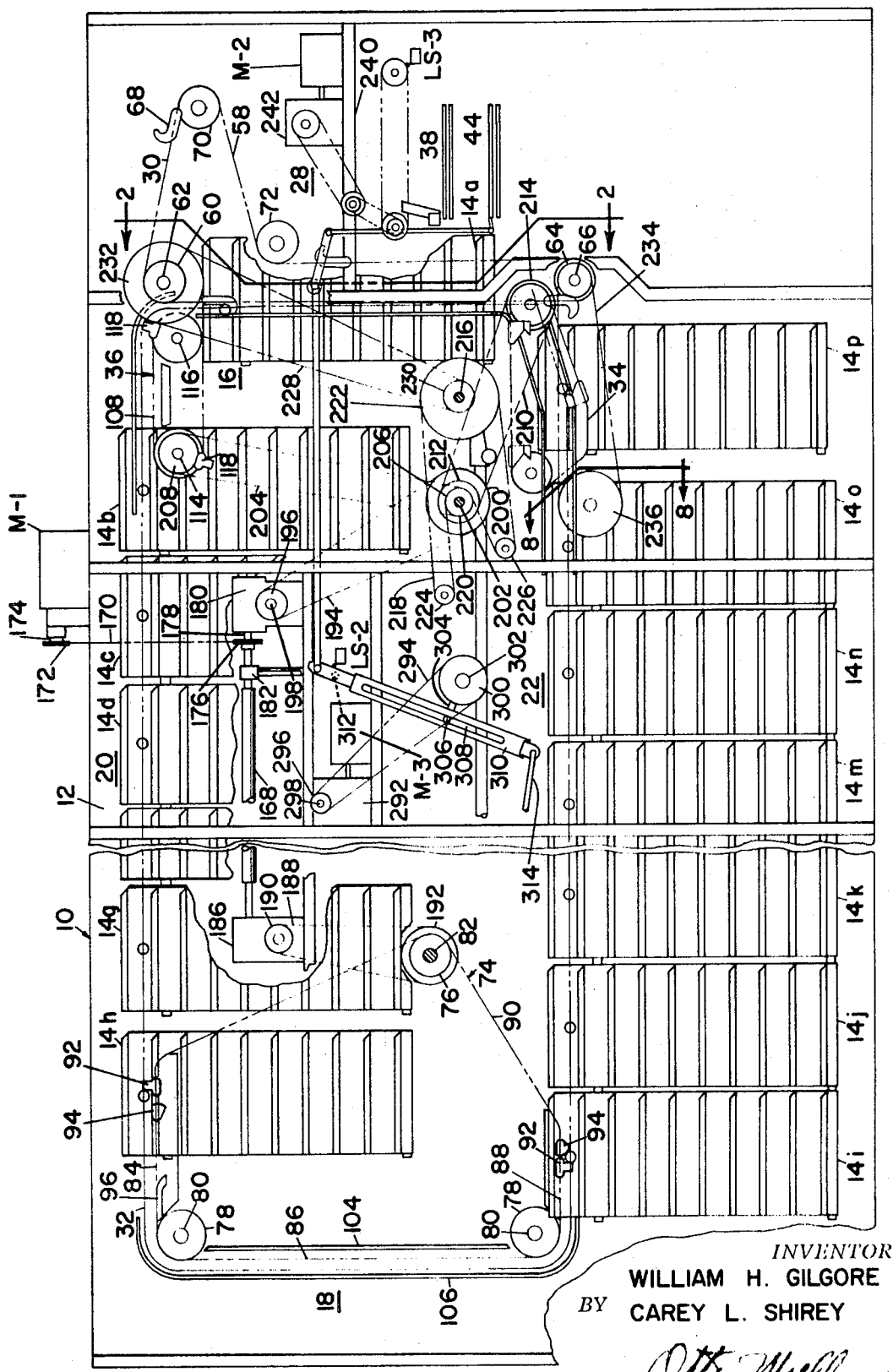
FIG. 1 is a longitudinal vertical sectional view through the proofer with the various elements contained therein shown more or less diagrammatically.

Referring particularly to FIG. 1 showing somewhat diagrammatically a preferred embodiment of the invention, the numeral 10 indicates a generally rectangular elongated proofer housing. The proofer housing 10 encloses a proofing chamber 12 through which racks 14, carrying pans of dough to be proofed, travel in an elongated closed loop including an ascending rum 16 near the forward end of the housing 10, a descending run 18 adjacent the rearward end of the housing 10, an upper horizontal run 20 and a lower run 22, the latter including a major horizontal run portion 24 and a minor terminal upwardly sloping run portion 26 adjacent the ascending run 16, as best shown in FIG. 3.

Figure 2:
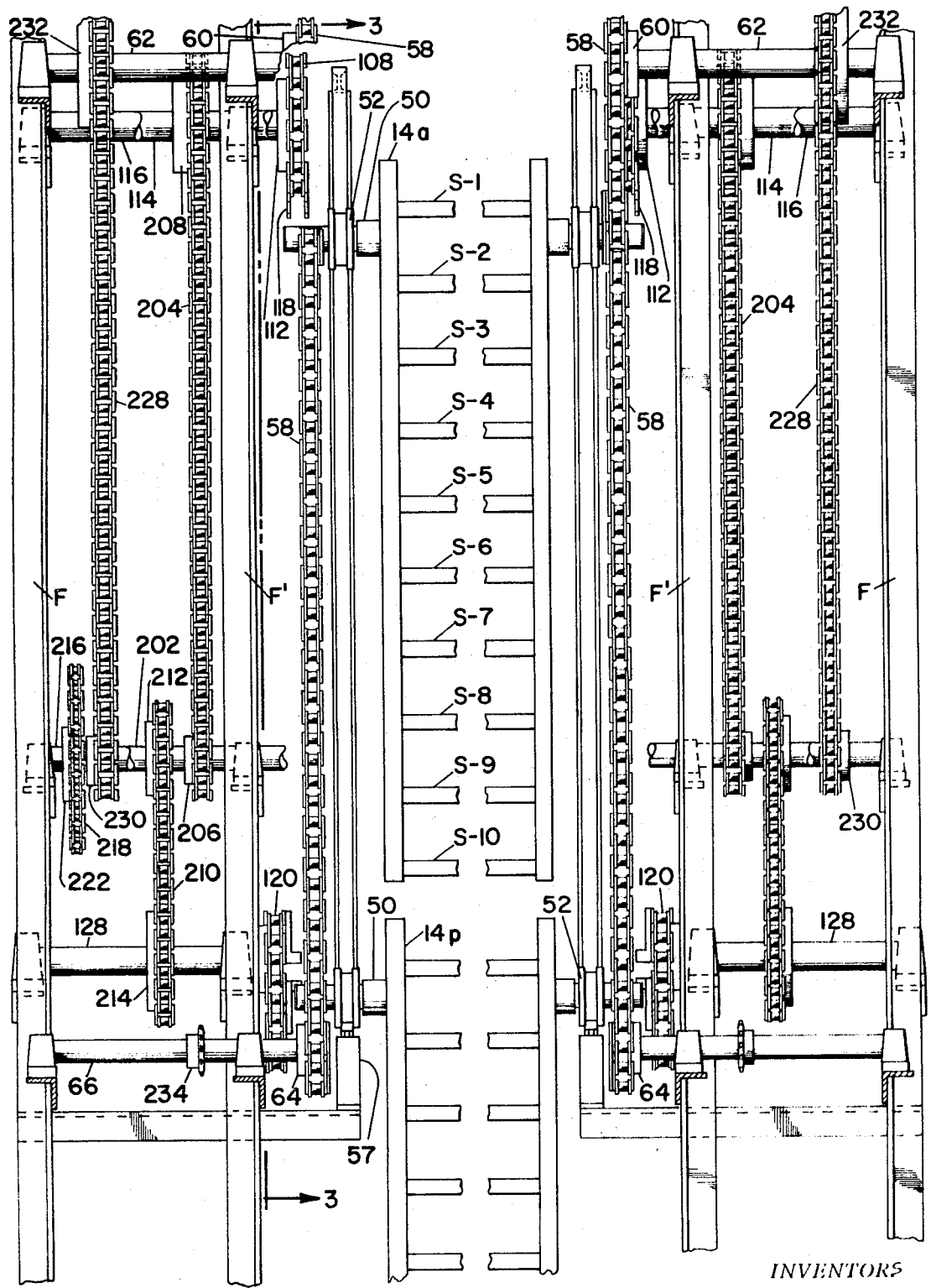
FIG. 2 is an enlarged sectional view taken on line 2—2 of FIG. 1.

The housing 10 is preferably in the form of a skeleton framework made up of suitable vertical and horizontal interconnected angle irons and other suitable structural elements arranged to be enclosed by sheet metal panels or other suitable enclosing means. The enclosing means is not shown in the drawings in order to better show the operating means within the housing 10. The skeleton framework includes at each side of the housing 10, outer and inner spaced frames F and F', as best shown in FIG. 2. Air conditioning means, not shown, is provided for supplying air at a desired temperature and humidity to the proofing chamber 12 to maintain therein desired dough proofing conditions.

The racks 14 are in the form of an open rectangular framework made up of metal bars, tubing or the like having a plurality of equidistantly spaced horizontal shelves, preferably of gridlike construction, adapted to support a plurality of side-by-side dough pans P.

The forward end portion of the proofer is arranged to provide a pan loading and unloading station 28, at which station successive transverse rows of pans of unproofed dough are loaded onto successive shelves of the racks 14 and successive transverse rows of pans of proofed dough are unloaded from successive shelves of the racks 14.

A continuously driven rack elevator, indicated generally by reference numeral 30 raises successive racks 14 at regular intervals through the ascending run 16 past the loading and unloading station 28 from the lower run 22 to the upper run 20. A continuously driven rack-lowering conveyor, indicated generally by the reference numeral 32, lowers successive racks 14 at regular intervals through the descending run 18 from the upper run 20 to the lower run 22. A continuously driven rack advance conveyor 34 at the forward end of the lower run 22 advances successive terminal racks 14 on lower run 22 to a position vertically aligned beneath a preceding ascending rack 14 where it is arranged to be picked up by the rack elevator 30. A continuously driven rack discharge conveyor 36 at the forward end of the upper run 20 picks up successive racks that have been elevated by the rack elevator 30, and discharges them along upper run 20 a distance and at a rate of speed to provide clearance for the succeeding racks that are being elevated. The details of construction and operation of the rack elevator, rack-lowering conveyor, rack advance conveyor and rack discharge conveyor will be hereinafter described with greater particularity.

A pair of vertically spaced horizontal endless conveyors extend transversely within the proofer housing 10 in the loading and unloading station 28, and are disposed a spaced distance forward of the path of the racks that are being elevated. These conveyors may be of conventional slat type, flattop chain link type or any other suitable type of construction, the details of which are not shown. The upper conveyor 38, hereinafter referred to as the loading conveyor, conveys successive rows of pans of dough in the proofer to a position in front of a rack being elevated by the rack elevator 30, where pusher means, hereinafter referred to as the loading pusher 40, pushes successive rows of pans from the loading conveyor 38 across a transfer plate 42 onto successive shelves of a rack 14, as the rack is continuously elevated through the loading and unloading station 28. The lower conveyor 44, hereinafter referred to as the unloading conveyor, is adapted to convey laterally toward one side of the proofer housing 10, pans of proofed dough which have been pushed from successive shelves of a rack 14 across a transfer plate 46 onto the loading conveyor 44 by pusher means, hereinafter referred to as the unloading pusher 48. The pushers, conveyors, transfer plates and associated means together with the operation of the same, is hereinafter described in greater detail.

RACKS

The racks 14 are all identical in construction, so that in describing any one particular rack it will be understood that it applies in similar manner to all the racks. For the purpose of identification of particular racks, suffix letters *a*, *b*, *c*, etc., have been applied to the rack reference character 14. Referring particularly to FIG. 3, rack 14*a* is shown as having ten equidistantly spaced shelves designated from top to bottom by the reference characters S–1 to S–10, and which shelves for purpose of illustration, may be 8 inches apart. It should be understood, however, that the number of racks, the number of shelves in a rack and the spacing of the shelves may vary with different proofers.

Typical of all the racks, rack 14*a* as best shown in FIGS. 2 and 3, is provided at each lateral side with a laterally outwardly projecting rack trunnion 50 carrying an outboard roller 52. The rack trunnions 50 and rollers 52 mounted thereon are disposed above the center of gravity of the rack 14*a* and located centrally between the front and rear sides of the rack. The outer ends of rack trunnions 50 projecting beyond the rollers 52 are adapted to be engaged by J-shaped hooks carried by the rack elevator 30, lugs carried by the rack advance conveyor 34 and the rack discharge conveyor 36, and by latch and lug means carried by the rack-lowering conveyor 32, hereinafter described in detail, for transporting the racks through the proofing chamber 12 in the previously referred to closed loop. At opposite sides of the proofing chamber 12 are upper tracks 54 extending longitudinally along upper run 20 and lower tracks 56 and 57 extending longitudinally along respective horizontal run portion 26 and terminal sloping run portion 26 of the lower run 22, providing guide supports along which the rollers 52 are adapted to roll as the racks 14 are transported along the upper and lower runs 20 and 22.

RACK ELEVATOR

The rack elevator 30, which elevates the rack 14 through the loading and unloading station 28 as previously described, includes a pair of endless chains 58 disposed in parallel vertical laterally spaced planes sufficiently far apart to receive a rack 14 therebetween. Referring particularly to FIGS. 2 and 3, the chains 58 are trained at their upper ends around sprockets 60 fixed on the inner ends of transversely extending stub shafts 62, which stub shafts are rotatably mounted in suitable bearings carried by outer and inner frames F and F' of the opposite sides of the proofer housing 10. At their lower ends, the chains 58 are trained around sprockets 64 fixed on the inner ends of transversely extending stub shafts 66, which stub shafts are rotatably mounted in suitable bearings carried by outer and inner frames F and F' of the opposite sides of the housing 10.

The lengths of the chains 58 are such as to carry four equidistantly spaced J-shaped hooks 68, with the distance between the J-hooks being equal to the distance between the top shelf S–1 and the bottom shelf S–10 of a rack plus one additional rack shelf space. To accommodate the length of the chains 58, they are trained around additional auxiliary forwardly offset sprockets 70 and 72, supported in suitable manner. The J-hooks 68 in their travel along the ascending run of the chains 58, as indicated by the directional arrow in FIG. 3, engage the rack trunnions 50 to elevate successive racks 14. With the described arrangement of the chains 58 and J-hooks 68, the distance between the bottom shelf of one rack and the top shelf of a succeeding rack, as the racks are elevated through the loading and unloading station 28, will be exactly one shelf space, or in the present example 8 inches. This is an important feature since it permits the loading pusher 40 to operate at regular equal intervals to push successive rows of pans from the loading conveyor 38 onto successive rack shelves and permits the unloading pusher 48 to operate at regular equal intervals to push successive rows of pans from successive rack shelves onto the unloading conveyor 44, whereby to simplify the pusher-operating control means and to insure equal residence time of each row of pans dough in the proofer.

Additionally, where the loading conveyor and unloading conveyor are spaced a shelf apart or nearly so, the pushers may be operated simultaneously and by a single motor. In the present instance the loading and unloading conveyors are preferably spaced a substantially greater distance apart than one shelf space of 8 inches, and for purpose of illustration is shown as 12 inches, though this may be increased or decreased. In such a construction, separate motors are provided for operating the pushers, and control means, to be described, is provided for operating them at appropriate times, when a rack shelf is in near alignment with the unloading conveyor and when a rack shelf is in near alignment with the loading conveyor. The chains 58 are driven continuously and the means for driving them will be described hereinafter in detail.

RACK-LOWERING CONVEYOR

The rack-lowering conveyor 32, previously referred to, is generally similar to the construction shown in Howard U.S. Pat. No. 3,349,928 and includes a pair of endless chains 74 disposed in parallel vertical laterally spaced planes sufficiently far apart to receive a rack therebetween. Referring particularly to FIG. 1, there is shown a chain 74 at the near side of the proofer trained around drive sprocket 76 and upper and lower driven sprockets 78. The driven sprockets 78 are fixed on the inner ends of transversely extending stub shafts 80 rotatably mounted in suitable bearings carried by outer and inner frames F and F' at the near side of the proofer. This chain, sprocket and stub shaft arrangement is duplicated at the far side of the proofer housing.

The drive sprockets 76 are fixed on opposite ends of a transversely extending through shaft 82 disposed in the space between the upper and lower row of racks 14, the shaft 82 being journaled at opposite ends in suitable bearings carried by the framework of the opposite sides of the proofer housing. Thus, by rotating through shaft 82, by drive means to be described, both chains 74 are driven. The described sprocket and chain arrangement provides in the rack-lowering conveyor, horizontal upper chain runs 84 for moving successive racks rearwardly along upper tracks 54 into position to be lowered; vertical descending chain runs 86 for lowering successive racks to the lower tracks 56; horizontal lower chain runs 88 for moving successive racks forwardly along lower tracks 56; and return chain runs 90.

The chains 74 are each provided with a pair of radially outwardly projecting equidistantly spaced lugs 92, which lugs are adapted to engage the laterally outer end portions of the rack trunnions 50 to move the racks along upper and lower chain runs 84 while 88. The chains 74 are each additionally provided in conventional manner, as shown in previously referred to Howard U.S. Pat. No. 3,349,928, with a pair of pivotally mounted latch members 94 just ahead of the lugs 92. The latch members 94 provide means for supporting the racks along the descending chain runs 86. Pivotal movement of latch members 94 relative to the chains 74 is limited, as shown in the Howard patent, by reason of engagement of chain pin extensions in slots in the free end portion of the pivoted latch members 94, whereby the latch members 94 are movable between a retracted position out of the path of rack trunnions 50 and an extended position in the path of rack trunnions 50.

A cam member 96 is disposed beneath the upper run 84 of each of the chains 74 in the path of the latch members 94. Engagement of the latch members 94 with the cam members 96 moves them to their extended position. A vertical chain guide 104 is provided along the descending chain run 86 of each of the chains 74 at the inner forward side thereof extending between the upper and lower sprockets 78. A vertical rack guide 106 is spaced rearwardly of each of the vertical chain guides 104 a distance adapted to closely receive the rack rollers 52 therebetween to guide the racks during their descent. The vertical chain guides 104 are also adapted to be engaged by the latch members 92 to retain them in extended position wherein they are adapted to be engaged by the rack trunnions 50 to support the racks during their descent.

The chains 74 of the rack-lowering conveyor 32 are continuously driven in timed relation with the chains 58 of the rack elevator 30, as hereinafter described, so that as a rack is being elevated, another rack is being lowered at the opposite end of the proofer, with the chains 74 traveling through a distance equal to the spacing between lugs 92 in the same time that the chains 58 travel through a distance equal to the spacing being a pair of successive J-hooks 68.

RACK DISCHARGE CONVEYOR

The rack discharge conveyor 36 is arranged to move successive racks from the upper end of the continuously driven rack elevator 30 rearwardly along the upper tracks 54 to the position shown occupied by rack 14b in FIGS. 1 and 3. The discharge conveyor 36 includes a pair of endless chains 108 disposed in vertical longitudinal laterally spaced planes, each of the chains 108 being offset in a plane slightly laterally outward of the plane of a respective elevator chain 58 for a reason which will become apparent, and as best shown in FIG. 2. Referring to FIGS. 1, 2 and 3, the chains 108 are trained around rearward drive sprockets 110 and forward driven sprockets 112. The sprockets 112 are so disposed that the chains 108, as they round the extreme forward peripheral portions of the sprockets 112, are spaced a distance rearward of the ascending run of the elevator chains 58 to permit rack trunnions 50 to pass freely between the adjacent portions of the chains 108 and 58, as may best be seen by referring to FIG. 3.

The sprockets 110 and 112 are mounted on the inner projecting ends of the stub shafts 114 and 116, respectively, which shafts are journaled in suitable bearings carried by the outer and inner frames F and F' at each side of the proofer housing. Each of the rack discharge conveyor chains 108 is provided with a pair of equidistantly spaced radially outwardly projecting lugs 118, one or the other pair of which are arranged to engage the trunnions 50 of a rack that has been elevated by the elevator chains 58, thereby lifting the rack from the rack-supporting J-hooks 68 of the chains 58 and moving the rack rearwardly along the tracks 54 to the positions shown occupied by rack 14b.

As previously stated, each of the rack discharge conveyor chains 108 is offset in a plane slightly laterally outward of a respective rack elevator chain 58. This is to permit the lug elements of lugs 118 formed with the inner and outer links of the chains 108 to pass by the J-hooks 68 which are connected to the inner links of the elevator chains 58, when a rack is lifted by the lugs 118 from the J-hooks 68.

The chains 108 of the rack discharge conveyor 36 are driven continuously, by drive means hereinafter described, in counterclockwise direction as viewed in FIGS. 1 and 3, by the same motor M-1 that drives the rack elevator 30, whereby the rack discharge conveyor 36 is driven in timed relation with the rack elevator 30. This timed relation is such that one pair of lugs 118 of chains 108, in the case of a rack with an even number of shelves, or each of the pair of lugs 118 of chains 108 alternately in the case of a rack with an odd number of shelves, will meet a pair of J-hooks 68 of the elevator chains 58, in order to engage the trunnions 50 of successive racks being elevated. It is furthermore important that the rate of travel of the rack discharge conveyor chains 108 be greater than the rate of travel of the elevator chains 58, so that the lugs 118 will overtake and lift a rack from the J-hooks 68 of the elevator chains 58 and also move the rack at least a horizontal distance such that its lower trailing edge will, with ample clearance, clear the leading upper edge of a succeeding rack that is being elevated.

When rack 14a, referring particularly to FIG. 3, has been elevated to a position ready to be picked up by the rack discharge conveyor 36, or in other words, when the rack trunnions 50 are in approximate horizontal alignment with the rack discharge conveyor shaft 116, the rack discharge conveyor lugs 118 lift the rack 14a from the elevator J-hooks and push it along the upper tracks 54 to the position shown occupied by rack 14b, and in so doing all the racks 14 on the upper run 20 will be pushed ahead one rack space. The terminal rack on the upper run will thus be pushed ahead into position to be picked up by the rack-lowering conveyor, and referring to FIG. 1, the terminal rack 14 has, as shown, already been picked up.

RACK ADVANCE CONVEYOR

The rack advance conveyor 34 moves successive terminal racks along the forward end portions of the lower tracks 56 to a position in vertical alignment with a preceding rack which is in the process of being elevated by the elevating conveyor 30, and to a position a shelf space or preferably a somewhat lesser distance than a shelf space below the preceding rack, where it is in position to be picked up by one of the pairs of J-hooks 68 of the rack elevating conveyor 30.

As previously pointed out, the J-hooks 68 of the elevator chains 58 are spaced a distance apart such that the bottom shelf S-10 of one rack and the top shelf S-1 of a succeeding rack, as the racks are elevated through the loading and unloading station 28, will be exactly one shelf space apart. Referring particularly to FIG. 3, since the back-to-front dimension $d$ of a rack is considerably greater than the rack shelf spacing $h$, for example as much as four or more times as great, and since a terminal rack, as rack 14p, cannot move beneath a preceding rack, as rack 14a, until the rack 14a has been elevated sufficiently so that its lower end will clear the upper end of rack 14p, it is apparent that the rack advance conveyor must operate at a considerably greater speed than the elevating conveyor 30 to move the rack 14p into vertical alignment below rack 14a in position to be picked up by an oncoming pair of J-hooks of the elevating conveyor 30.

The inclined rack roller track terminal portions 57, previously referred to, slope upwardly from a point indicated in FIG. 3 at X, for a distance and at an angle such that a rack moves therealong a horizontal distance equal to or slightly exceeding the dimension $d$ of a rack to position a rack in vertical alignment with a preceding rack in the process of being elevated, while raising the rack a vertical distance equal to a rack shelf space *h*. The rack advance conveyor is operated at a speed such that it raises a rack, as for example rack 14*p*, through said rack shelf space *h* somewhat faster than a preceding rack, for example rack 14*a*, is raised by the elevator through a rack shelf space, so that when the rack 14*p* reaches vertical alignment with rack 14*a*, the top shelf of rack 14*p* is, for purpose of illustration, 7½ inches below the bottom shelf of rack 14*a*, where for example the shelf spacing *h* is 8 inches. The rack 14*p* therefore arrives in position to be picked up by the elevating conveyor somewhat prior to the arrival of the oncoming pair of elevator conveyor J-hooks, to provide a certain amount of tolerance.

Lost motion means, to be described, is provided for retaining the rack 14*p* in said last-named position even though the rack advance conveyor is continuously operated. The rack 14*p* is retained in such immobilized position for a sufficient length of time for the elevator J-hooks 68 to engage and raise the rack 14*p* to provide a shelf spacing *h* between shelf S–10 of rack 14*a* and shelf S–1 of rack 14*p* as they are elevated through the loading and unloading station.

The rack advance conveyor 34 includes a pair of endless chains 120 disposed in vertical longitudinally laterally spaced parallel planes at opposite sides of the proofer and offset a substantial distance laterally outward of the elevating conveyor chains 58, as best shown in FIG. 2, for a reason which will become apparent as the description proceeds. The upper horizontal runs of the chains 120 are trained over rearward driven sprockets 122 and forward drive sprockets 124, mounted respectively on the inner ends of stub shafts 126 and 128, which shafts are journaled in suitable bearings carried by the outer and inner frames F and F' at each side of the proofer housing. The lower runs of the chains 120 are guided in tracks 130 paralleling the forward end portion of the horizontal rack roller track 56 and the inclined rack roller track terminal portion 57. The chains 120 of the rack advance conveyor are driven continuously, by drive means to be hereinafter described, in counterclockwise direction, as viewed in FIGS. 1 and 3, by the same motor M–1 that drives the rack elevating conveyor, whereby the rack advance conveyor is operated in timed relation with the rack-elevating conveyor, so that the racks are presented by the rack advance conveyor 34 at the proper position and the proper time to be picked up by the rack-elevating conveyor 30.

The rack advance conveyor includes a plurality, in the present instance three, equidistantly spaced rack pushers 132 carried by each of the rack advance conveyor chains 120. Each of the rack pushers 132 includes a plate member 134 disposed in a longitudinally extending vertical plane attached by chain pivot pins 136, as best shown in FIG. 3, to the inwardly facing surface of the inner links of the conveyor chains 120 and projecting radially inward of the loops of the conveyor chains 120. The thickness of the plate members 134 is such that they comfortably clear the ends of the rack trunnions 50 as best shown in FIG. 2. Rigidly secured to the inner face of each of the plate members 134 at its radially inner end is a lug 138, provided with an angularly disposed leading edge 140, as best shown in FIGS. 6A–6D and FIG. 7, arranged to engage a rack trunnion 50 to push a rack into position to be picked up by the elevating conveyor as the rack pushers 132 move along the lower runs of the rack advance conveyor chains 120. The leading pushing edges 140 of the lugs 138 are preferably at approximately a 45° angle with respect to the runs of the chains along which they are traveling, for a reason to be hereinafter explained.

Figure 6A:
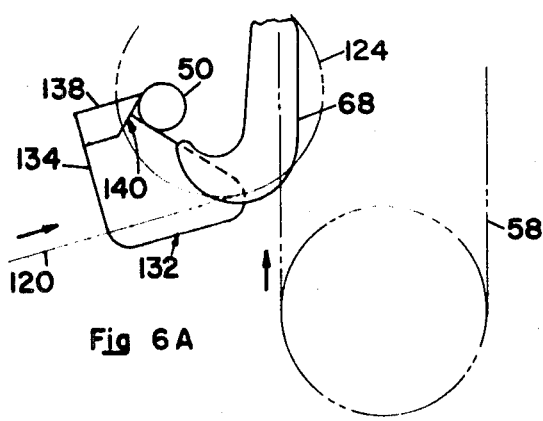
FIGS. 6A, 6B, 6C, 6D and 6E are diagrammatic views showing the relative positions of the rack trunnion, rack advance conveyor trunnion-engaging element and rack-elevating conveyor trunnion-engaging element at progressive stages of the transfer of a rack from the track advance conveyor to the rack-elevating conveyor.
Figure 6B:
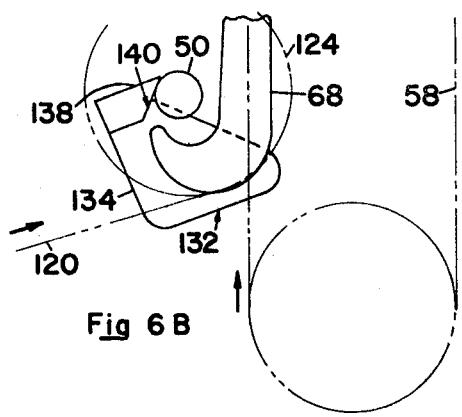
Figure 6C:
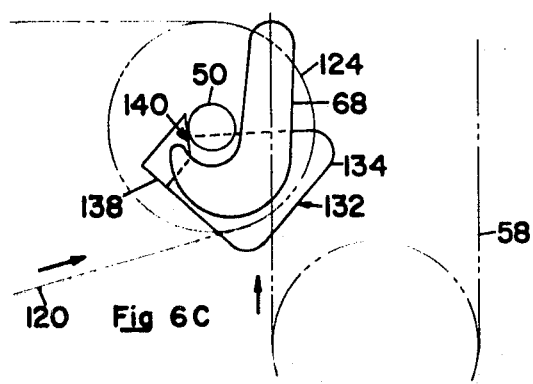
Figure 6D:
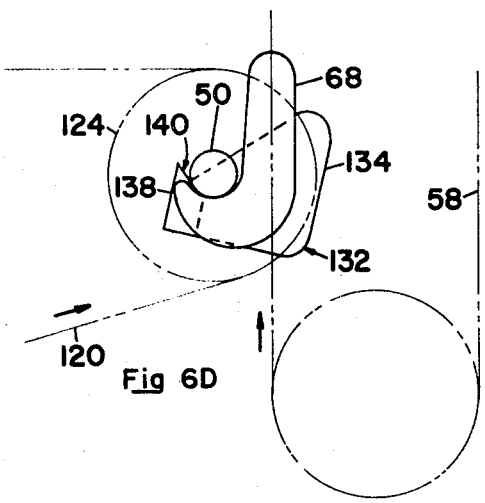
Figure 6E:
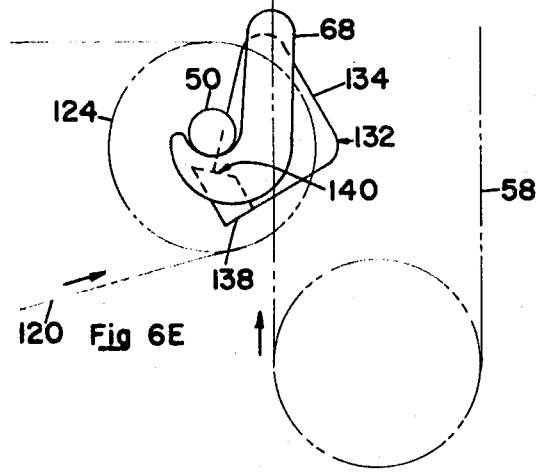

In FIGS. 6A, 6B, 6C, 6D, and 6E there is shown somewhat diagrammatically the relative positions of the rack pusher 132, the rack trunnion 50 and the elevator conveyor J-hook 68, as the rack advance conveyor chain 120 rounds the sprocket 124 during transfer of a rack from the rack advance conveyor 34 to the rack elevator 30. For the reason previously pointed out, the speed of the rack advance chain 120 is substantially greater than the speed of the rack elevator chain 30, and assuming for purpose of illustration that the rack advance chain speed is five times the elevator chain speed, and 1. as the pusher 132 approaches its curved path around the sprocket 124 from the position shown in FIG. 6A to the position shown in FIG. 6B; the pusher lug 138 moves the rack trunnion 50 a considerable distance to the right, while the elevator J-hook 68 moves upwardly a comparatively smaller distance;

2. as the pusher 132 rounds the curved lower peripheral portion of the sprocket 124 from the position shown in FIG. 6B to the position shown in FIG. 6C; the leading edge 140 of the pusher lug 138 starts to rotate downwardly around the rack trunnion 50 while moving it ahead a short distance to bring the rack, for example rack 14*p* in FIG. 3, in vertical alignment with and below the preceding rack, for example rack 14*a* in FIG. 3, while the J-hook 68 has moved upwardly to a position slightly below the rack trunnion 50:

3. as the pusher 132 rounds the curved forward medial portion of the sprocket 124 from the position shown in FIG. 6C to the position shown in FIG. 6D; the leading edge 140 of pusher lug 138 rotates downwardly around the rack trunnion 50 without pushing it ahead to thereby immobilize or provide the rack with lost motion permitting the rack trunnion 50 to nest in the J-hook 68 as the J-hook continues to move upward:

4. as the pusher 132 rounds the curved upper peripheral portion of the sprocket 124 from the position shown in FIG. 6D to the position shown in FIG. 6E; the pusher 132 continues to rotate downwardly toward an inverted position, and with the pusher lug 138 now disengaged from the rack trunnion 50 as the elevator J-hook 68 continues to raise the rack, the pusher lug 138 passes freely below the rack trunnion as the pusher 132 moves rearwardly along the upper run of the rack advance chain 120.

RACK STOP LATCH

The rack-lowering means 32, as previously explained, moves successive racks from the upper run 20 to and along lower run 22 to a position a short distance forward of the position shown occupied by rack 14*i*, in other words to a position where the lugs 92 are disengaged from rack trunnions 50 as the lugs 92 move from lower chain runs 88 to return chain runs 90, and in the process moves all the racks on the lower run ahead one rack space. In order to prevent coasting of the terminal rack beyond such a rack space, pivotally mounted latch plates 142 are arranged for movement into the path of the outboard rollers 52 at opposite sides of a rack. The pivotally mounted latch plates 142 are arranged to be moved out of engagement with the outboard rack rollers 52 when a succeeding rack engaged by the rack-lowering means 32 moves into position to push the racks on the lower run 22 ahead a rack space.

Figure 9:
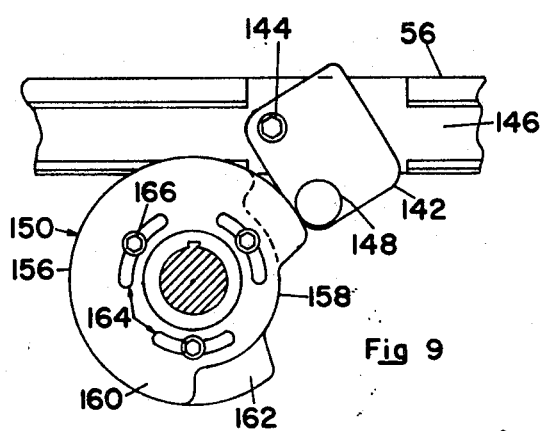
FIG. 9 is a sectional view taken on the line 9—9 of FIG. 8 showing the latch control cam.

In describing the latch-plate-operating means at one side of the proofer, as shown in FIGS. 1, 8 and 9, it is understood that such means is duplicated at the opposite side of the proofer. The latch plate 142 is pivotally mounted on a capscrew 144 extending through and rigidly secured to the web 146 of the lower track 56 as best shown in FIGS. 8 and 9. The latch plate 142 carries a cam follower roller 148 engageable with the periphery of a cam 150 for controlling movement of the latch plate 142 into and out of engagement with an outboard rack roller 52. The cam 150 is mounted on a transversely extending stub shaft 152 for rotation therewith, the shaft 152 being journaled in suitable bearings disposed and suitably supported on a frame means 154 between outer and inner frames F and F' at the side of the proofer.

The cam 150 is arranged to make one revolution per rack and for this purpose is driven, through means hereinafter described, in timed relation with the rack elevator 30, and consequently in timed relation with the rack-lowering means 32 since the rack elevator and rack-lowering means are driven in timed relation as previously described. The cam 150 is provided with a high portion 156 and a valley 158.

The cam 150 is so oriented that just as the outboard roller 52 of the leading rack of a row of advancing racks approaches the position shown occupied by rack 14o, the high portion 156 of cam 150 engages the cam follower roller 148 to raise the latch plate 142 for engagement with the rack outboard roller 52 to hold the rack against coasting. The peripheral extent of the high portion 156 of cam 150 is such that just prior to advancement of the row of racks by engagement therewith of a rack being discharged by the rack-lowering means 32, the cam follower roller 148 drops off the high portion 156 of cam 150 into the valley 158, to lower the latch plate 142 and release the arrested row of racks.

In order to adjust the cam 150, it is formed in two parts 160 and 162 which are relatively rotatably adjustable about the shaft 152, one of the parts 160 of the cam 150 being provided with arcuate slots 164 for receiving bolts 166 for clamping the two parts of the cam in desired adjusted relation.

Upon release of the arrested row of racks, the arrangement is such that the terminal rack is pushed forward to a position in which its outboard roller is just approaching the point X where the sloping track portion 57 begins, when a lug 138 of the rack advance pusher 132, which is traveling at a greater speed, for example 1½ times as fast, overtakes the moving rack and engagement of the lug 138 with the end of the rack trunnion 50 moves the rack to a position to be picked up by the elevator 30, as previously described. Since engagement of the rack by the rack advance conveyor occurs during forward movement of the rack, jarring of the rack is considerably minimized so that the now almost completely proofed dough, which is extremely sensitive to shock and rough handling, is rendered considerably less susceptible to dislocation in the pan or collapse of the raised dough.

RACK ELEVATOR, RACK LOWERING, RACK DISCHARGE, RACK ADVANCE AND RACK STOP LATCH DRIVE MEANS

The rack elevator 30, the rack lowering means 32, the rack discharge conveyor 36, the rack advance conveyor 34 and rack stop-latch-operating means are continuously driven by same motor M-1 and operate in synchronized timed relation. The motor M-1 is mounted in any suitable location and as shown in FIG. 1 is mounted on top of the proofer housing 10 between the forward and rearward ends thereof, on the right side thereof viewed facing the front of the proofer. Motor M-1 drives a longitudinally extending torque tube 168 journaled in suitable bearings carried by proofer housing framework between outer and inner frames F and F' at the right side of the proofer. The drive means includes a chain 170 trained around a sprocket 172 on the motor output shaft 174 and a sprocket 176 on the input shaft 178 of a gear reducer 180. The gear reducer input shaft 178 is operatively connected with the forward end of the torque tube 168 by a drive coupling 182.

The rearward end of the torque tube 168 is operatively connected to a gear reducer 186. A chain 188 is trained around a sprocket 190 fixed on the output shaft of gear reducer 186 and a sprocket 192 fixed on the previously described transversely extending through shaft 82 for driving the rack lowering endless chains 74, as previously described.

A chain 194 is trained around a sprocket 196 fixed on the output shaft 198 of the gear reducer 180 and a sprocket 200 fixed on a transversely extending through shaft 202 suitably journaled in bearings carried by outer and inner frames F and F' at each side of the proofer. A pair of chains 204 at opposite sides of the proofer are trained around sprockets 206 fixed on opposite ends of through shaft 202 and around sprockets 208 fixed on the stub shafts 114 of the previously described rack discharge conveyor 36 for operating the same. A pair of chains 210 at opposite sides of the proofer are trained around sprockets 212 also fixed on opposite ends of through shaft 202 and around sprockets 214 fixed on the stub shafts 128 of the previously described rack advance conveyor 34 for operating the same.

The chains 58 of the rack elevator 30 travel in a direction opposite the chains 108 of the rack discharge conveyor 36 and the chains 120 of the rack advance conveyor 34, as indicated by the arrows in FIG. 3, and for this purpose the drive includes a supplemental transversely extending through shaft 216 suitably journaled in bearings carried by outer and inner frames F and F' at each side of the proofer. A chain 218 is trained in such manner around a sprocket 220 fixed on one end of through shaft 202, a sprocket 222 fixed on one end of through shaft 216 and supplemental sprockets 224 and 226, so that shaft 216 rotates in a direction opposite the shaft 202. A pair of chains 228 at opposite sides of the proofer are trained around sprockets 230 fixed on opposite ends of through shaft 216 and around sprockets 232 fixed on the stub shafts 62 of the previously described rack elevator 30 for operating the same. Completing the drive means, and referring particularly to FIGS. 1, 2 and 8, a pair of sprocket chains 234 are trained over sprockets 236 fixed on the stub shafts 152 and sprockets 238 fixed on the stub shafts 66 at the lower end of the rack elevator 30, whereby the previously described rack stop latch control cams 150 are operated.

LOADING PUSHER

Referring particularly to FIGS. 1, 3, 4 and 5, there is mounted on a bracket 240 in the forward end of the proofer between the outer and inner frames F and F', preferably at the right side of the proofer, a motor M-2 and coupled gear reducer 242 for intermittently actuating the pusher bar 244 of the loading pusher 40. The pusher bar 244 is caused to be moved, by means to be described, in a rearward direction or pan-pushing stroke along a lower run in relatively close proximity across the surface of the loading conveyor 38 and transfer plate 42 for pushing successive rows of pans of dough onto successive shelves of racks 14, and is further caused to be moved in an elevated forward direction or retracting stroke along an upper run above the level of the next row of pans advanced by the loading conveyor 38.

The pusher bar 244 is pendently supported by brackets 246 from a transversely extending hollow tubular shaft 248 that is rotatably connected at its ends, in a manner to be described, to respective laterally spaced longitudinally extending endless chains 250. Each of the chains 250 is trained at one end around a drive sprocket 252 adjacent the rearward side of the loading conveyor 38 and in vertical spaced relation with respect thereto; and each of the chains 250 is trained at its other end around a sprocket 254 adjacent the forward side of the loading conveyor 38 and similarly in vertical spaced relation with respect thereto. Rigidly secured to the inner face of a link of each of the chains 250 is a chain connector 256 having a transversely inwardly projecting pin 258 extending into a respective end of the hollow tubular shaft 248 to permit the shaft 248 to freely rotate about the axes of the pins 258.

The drive sprockets 252 are fixed on the inner ends of stub shafts 260 journaled in suitable bearings supported by frame elements at opposite sides of the proofer, and 254 are fixed on the inner ends of stub shafts 262 journaled in suitable bearings supported by frame elements at opposite sides of the proofer. The chains 250 are driven in the direction of the arrows in FIG. 4, and the drive means includes a transversely extending through shaft 264 above the loading pusher 40 journaled at its ends in suitable bearings supported between the outer and inner frames F and F' at opposite sides of the proofer. Rotation is imparted to the through shaft 264 by chain 266 trained over a sprocket 268 fixed on the output shaft 270 of gear reducer 242 and a sprocket 272 fixed on one end of the through shaft 264. Completing the drive is a pair of chains 274 at opposite sides of the proofer trained around sprockets 276 fixed on opposite ends of through shaft 274 and around sprockets 278 fixed on the stub shafts 260.

Secured to each end of the hollow tubular shaft 248 and extending at right angles therefrom is an arm 280 supporting at its free end an outboard roller 282. The outboard rollers 282 are confined between horizontal guide tracks 284 extending longitudinally beneath the lower runs of the chains 250. With the chains 250 operating in the direction of the arrows, the pusher bar 244 pushes a row of pans across the surface of the loading conveyor 38 and the transfer plate 42 onto the shelf of a rack 14, during movement thereof from left to right along the lower runs of the chains 250.

After reaching the end of its pushing stroke, the pusher bar 244 is retracted along an upwardly sloping angle as the rotatably mounted ends of the hollow tubular shaft 248 follow the arcuate paths of the chains 250 as the latter travel about the peripheries of the sprockets 252. As the hollow tubular shaft 248 is moved by the chains 250 along their upper runs, the pusher bar 244 moves to retracted position above pans on the loading conveyor 38.

Control means, hereinafter described, operated in timed relation with the rack elevator, is employed for controlling intermittent operation of the motor M-2 so that the pusher bar 244 completes a cycle of operation from its retracted position to its extended position and back to its retracted position during each elevation of a rack through one shelf space. However, for reasons that will become apparent, the pusher bar 244 is operated at a speed such that it completes a cycle of operation for each travel of the rack elevator 30 through only a minor portion of a rack shelf space.

UNLOADING PUSHER

The unloading pusher 48 is generally similar to the construction shown in Howard U.S. Pat. No. 3,349,928 and includes a rectangular frame 286 comprising a pair of laterally spaced, longitudinally extending tubular frame members 288, the frame members 288 being connected at their forward ends by a transversely extending pusher bar 290. Each of the longitudinal tubular frame members 284 is supported by means, not shown, preferably by a pair of vertically spaced concave rearward rollers and a pair of vertically spaced concave forward rollers as shown in the above referred to Howard patent, whereby the unloading pusher is freely movable in a longitudinal path.

By means hereinafter described, reciprocating intermittent movement is imparted to the unloading pusher 48, from a retracted position as shown in FIGS. 1 and 3, to an extended position and back to its retracted position. On the extending stroke of the unloading pusher 48, the pusher bar 290 sweeps successive rows of pans of proofed dough from successive rack shelves pivotally mounted transfer plate 42 onto the unloading conveyor 44, as the racks 14 are continuously elevated through the loading and unloading station 28.

The unloading pusher is operated from a motor M-3 and coupled gear reducer 292 mounted in suitable manner between outer and inner frames F and F' at one side of the proofer housing 10, preferably the left side. The drive means includes a chain 294 trained over a sprocket 296 fixed on the output shaft 298 of the gear reducer 292 and a sprocket 300 fixed on one end of the transversely extending through shaft 302. Secured on opposite ends of the through shaft 302 between outer and inner frames F and F' at each side of the proofer housing 10, are radially extending crank arms 304. The free end of each of the crank arms 304 carries a cam follower 306 engaging a cam groove 308 in a pusher-operating arm 310. Each of the pusher-operating arms 310 is pivotally mounted at its upper end on a transverse stub shaft 312 journaled in suitable bearings carried by outer and inner frames F and F', the stub shafts 312 and through shaft 302 being disposed in a common transverse vertical plane, with the stub shafts 312 being spaced above the through shaft 302.

Control means, hereinafter described, operated in timed relation with rack elevator 30, is employed for controlling intermittent operation of motor M-3 so that crank arms 304 make one complete revolution during each elevation of a rack through one shelf space. However, for reasons that will become apparent, the crank arms 304 make one complete revolution for each travel of the rack elevator 30 through only a minor portion of a rack shelf space.

Tie rods 314 pivotally connect the lower ends of the pusher-operating arms 310 with the rearward end of the unloading pusher frame 286. Through the above-described linkage, it will be seen that for each complete revolution of the crank arms 304, the unloading pusher 48 moves from a retracted position, as shown in FIG. 3, to an extended pan-pushing position and back to a retracted position, as described above.

LOADING AND UNLOADING PUSHER CONTROL MEANS

The loading and unloading pusher control means will now be described with reference to the positions of the loading pusher 40, unloading pusher 48 and other elements of the proofer as shown throughout the various figures. In such position, the unloading pusher 48 has pushed a row of pans from shelf S-10 of rack 14a onto the loading conveyor 44 and has returned to its retracted position; and the loading pusher 40 is just about to complete its pushing stroke to load a row of pans from the loading conveyor 38 onto the shelf S-9 of rack 14a.

Referring particularly to FIGS. 3 and 10, the control means includes a rotatable camshaft 316 mounted in a convenient location in the proper housing arranged to be driven in timed relation with the elevator 30. The drive means includes a chain 318 trained over a sprocket 320 fixed on camshaft 316 and over a sprocket 322 fixed on the shaft 62 of the elevator 30, the drive ratio being such as to cause camshaft 316 and cam discs 324 and 326 fixed on camshaft 316 to make one revolution for each elevation of a rack through one rack shelf space $h$.

When rack 14p is in position to be engaged by the elevator and has been raised to a point where its top shelf is in position to be unloaded, cam disc 324 will have rotated from its position as shown in FIG. 10 to a position in which its detent 328 is momentarily engaged by cam limit switch CLS-1 to cause its normally closed held open contact CLS-1a to close, thereby energizing latch coil CR-1-L of latch relay CR-1, causing relay contact CR-1a to close and completing a circuit to and energizing unloading pusher motor M-1, as may be seen from wiring diagram FIG. 11.

As soon as unloading pusher 48 starts, normally open held-closed limit switch LS-2 opens to maintain the latch relay CR-1 in latched condition. When the unloading pusher 48 completes its cycle, which it does in a fraction of the time that the rack is elevated through a rack shelf space, as previously pointed out, limit switch LS-2 is reclosed by engagement therewith of the upper end of one of the pusher operating arms 310, as shown in FIG. 1. Reclosing of limit switch LS-2 and closed contact CLS-1b energizes the unlatch coil CR-1-U of latch relay CR-1, causing relay contact CR-1a to open and break the circuit to and stop the unloading pusher motor M-3. The cam disc 324 will now again be in the position shown in FIG. 10, ready for the next cyclic operation described above.

In the position of the various elements of the proofer as shown throughout the various Figures, the loading pusher 40, as above set forth, has almost completed its pushing stroke in pushing a row of pans from the infeed conveyor 38 across the transfer plate 42 onto the shelf S-9 of rack 14a. Referring to FIGS. 3 and 10, the second cam disc 326 is disposed on the cam shaft 316 so that its detent 330 is arranged to be momentarily engaged by cam limit switch CLS-2 when a rack shelf is slightly below the level of the infeed conveyor 38 and transfer plate 42, and the loading pusher is in its retracted position. Momentary engagement of cam limit switch CLS-2 in detent 330 closes its normally closed held open contact CLS-2a, completing a circuit to and energizing latch coil CR-2-L of latch relay CR-2, thereby closing relay contact CR-2a to complete a circuit to and energize loading pusher motor M-2.

As soon as loading pusher 40 starts, normally open held-closed limit switch LS-3, FIG. 1, is disengaged to maintain the latch relay CR-2 in latch condition. When the loading pusher 40 completes its cycle, which it does in a fraction of the time that the rack is elevated through a rack shelf space, as previously pointed out, limit switch LS-3 is reclosed by engagement therewith of the pusher. Reclosing of limit switch LS-3 and closed contact CLS-2$b$ energizes the unlatch coil CR-2-U of latch relay CR-2, causing relay contact CR-2$a$ to open and break the circuit to and stop the loading pusher motor M-2. Now, when the cam disc 326 completes its revolution to the position in which detent 330 is momentarily engaged by cam limit switch CLS-2, a new pushing cycle is ready to start.

The endless loading and unloading conveyors 38 and 44 are arranged to be operated intermittently, once for each elevation of a rack 14 by rack elevator 30 through one shelf space and more specifically during the interval when the loading and unloading pushers 40 and 48 are in their retracted or rest position. The loading and unloading conveyors 38 and 44 are actuated and arranged to travel a linear distance sufficient to respectively introduce a row of pans into the proofer in position to be pushed onto the shelf of a rack and to discharge a row of pans delivered thereto from a rack shelf.

We claim:

1. In a product-treating apparatus provided with a treating chamber;
    means for conducting a succession of racks, having a plurality of superimposed equidistantly spaced product supporting shelves, through said chamber in a closed loop;
    said means including upper and lower longitudinally extending track means for supporting on each a row of contiguous racks and an elevating conveyor at one end of said track means having rack-engaging elements for raising successive racks to said upper track means;
    an endless rack-advancing conveyor at the end portion of said lower track means adjacent said elevating conveyor having rack-engaging means;
    said endless conveyor having a rack-engaging run portion sloping upwardly at an angle to the horizontal equal to $h/d$, where $h$ is approximately equal to a rack shelf space and $d$ is approximately equal to the back to front dimension of a rack; and
    means for operating said rack advance conveyor at a speed to advance successive racks into position to be picked up by successive elevator rack-engaging means.

2. An apparatus as set forth in claim 1 including common operating means for continuously operating said elevating and rack-advancing conveyor in timed relation.

3. In a product-treating apparatus provided with a treating chamber;
    means for conducting a succession of racks, having a plurality of superimposed equidistantly spaced product-supporting shelves, through said chamber in closed loop;
    said means including upper and lower longitudinally extending track means for supporting on each a row of contiguous racks and an elevating conveyor at one end of said track means having a rack-engaging elements for raising successive racks to said upper track means;
    an endless rack-advancing conveyor at the end portion of said lower track means adjacent said elevating conveyor provided with rack-engaging elements;
    drive means for continuously operating said rack-elevating conveyor and rack advance conveyor in timed relation to advance successive racks by said rack advance conveyor into position to be picked up by successive elevating conveyor rack-engaging elements; and
    a lost motion connection between said endless rack-advancing conveyor and its rack-engaging elements for immobilizing said racks for short periods of time in said last named position sufficient to permit the said elevating conveyor rack-engaging elements to pick up a rack from said advancing conveyor rack-engaging elements.

4. An apparatus in accordance with claim 3 in which said endless rack advancing conveyor has a rack-engaging run portion, sloping upwardly at an angle to the horizontal equal to $h/d$, where $h$ is approximately equal to a rack shelf space and $d$ is approximately equal to the back-to-front dimension of a rack.

5. In a product-treating apparatus;
    means for conducting a succession of racks in a closed loop including upper and lower longitudinally extending track means for supporting on each row of contiguous racks movable therealong;
    racks having a plurality of superimposed equidistantly spaced shelves;
    an endless elevating conveyor at one end of said track means having a plurality of equidistantly rack-engaging means spaced apart a distance equal to the distance between the top and bottom shelf of a rack plus one additional rack space;
    an endless rack-advancing conveyor at the end portion of said lower track means adjacent said elevating conveyor provided with rack-engaging elements;
    drive means for continuously operating said rack-elevating conveyor and rack advance conveyor in timed relation to advance successive racks by said rack-engaging elements into position to be picked up by successive elevating conveyor rack-engaging means; and
    a lost motion connection between said endless rack-advancing conveyor and its rack-engaging elements for immobilizing said racks for short periods of time in said last named position sufficient to permit the said elevating conveyor rack-engaging means to pick up a rack from said advancing conveyor rack-engaging elements.

6. An apparatus in accordance with claim 5 wherein the means for operating said endless rack-elevating conveyor in timed relation with said endless rack-advancing conveyor includes means for operating said endless rack-advancing conveyor at a substantially greater speed than said endless rack-elevating conveyor.

7. In a product-treating apparatus provided with a treating chamber;
    means for conducting a succession of racks having a plurality of superimposed equidistantly spaced product-supporting shelves, through said chamber in a closed loop;
    said means including upper and lower longitudinally extending track means for supporting on each a row of contiguous racks, an elevating conveyor at one end of said track means having rack-engaging elements for raising successive racks to said upper track means;
    an endless rack-advancing conveyor at the end portion of said lower track means adjacent said elevating conveyor having rack-engaging elements, said endless rack-advancing conveyor having a rack-engaging run including a rearward horizontal portion and a forward upwardly sloping portion, said means also including a rack-lowering conveyor at the opposite end of said track means including a horizontal run portion extending along said lower track means and having rack-engaging elements for engagement and disengagement with said racks for moving them in end to end engagement along said lower track means to move the terminal rack along the horizontal run portion of said rack-advancing conveyor;
    means operating said rack-advancing conveyor at a substantially greater speed than said rack-lowering conveyor whereby the rack-engaging elements of said rack-advancing conveyor overtake and engage said moving terminal rack to convey it along the sloping run portion of said rack advance conveyor into position to be engaged by the rack-engaging elements of said elevating conveyor.

8. An apparatus as set forth in claim 7 wherein said sloping portion of said rack-advancing conveyor is disposed at an angle to the horizontal equal to $h/d$, where $h$ is approximately equal to a rack shelf space and $d$ is approximately equal to the back-to-front dimension of a rack.

9. In a product-treating apparatus provided with a treating chamber;

means for conducting a succession of racks having a plurality of superimposed equidistantly spaced product supporting shelves, through said chamber in a closed loop, said racks having laterally projecting trunnions, said means including upper and lower longitudinally extending track means for supporting on each a row of contiguous racks, an elevating conveyor at one of said track means having rack-engaging elements for raising successive racks to said upper track means;

an endless rack-advancing conveyor at the end portion of said lower track means adjacent said elevating conveyor defining a longitudinally elongated closed loop having upper and lower runs;

means for unidirectionally and continuously driving said endless rack-advancing conveyor in a direction such that the lower run travels toward said elevated conveyor; and rack pusher elements secured to said endless rack-advancing conveyor extending in a direction radially inward of said closed loop a distance such that the inner end of said rack pusher elements engage and are arranged to rotate downwardly about the axes of said rack trunnions as said pusher elements round the turn at the forward end of said endless rack-advancing conveyor to hold the racks stationary for a sufficient length of time to permit the elevator rack engaging elements to raise the rack from engagement with the rack advance conveyor rack trunnion-engaging elements.

10. An apparatus as set forth in claim 9 wherein the lower rack engaging run of said endless rack-advancing conveyor is sloped upwardly at an angle to the horizontal equal to $h/d$, where $h$ is approximately equal to a rack shelf space and $d$ is approximately equal to the back-to-front dimension of a rack.

11. An apparatus as set forth in claim 10 wherein said rack advance conveyor is operated at a substantially greater speed than said elevating conveyor to advance successive racks into position to be picked up by successive elevator rack-engaging elements.

12. In a product-treating apparatus provided with a treating chamber;

means for conducting a succession of product-supporting racks through said chamber in a closed loop;

said conducting means including upper and lower longitudinally extending tracks for supporting on each a row of contiguous racks, an elevating conveyor at one end of said tracks for raising successive racks to said upper tracks, a rack-advancing conveyor at the end portion of said lower track adjacent said elevating conveyor for advancing successive racks thereto, and a rack conveyor for advancing successive racks thereto, and a rack conveyor having a vertical run portion for lowering successive racks to said lower track and a horizontal run portion for moving said successively lowered racks therealong to push said contiguous row of racks ahead one rack space;

latch means mounted adjacent the rearward end of said rack advancing conveyor for movement into rack-arresting and rack-releasing position; and control means operated in timed relation with said rack-conducting means for moving said latch means into rack-releasing position when a rack is advanced along said horizontal run portion of said rack-lowering conveyor to engage said row of contiguous racks to permit the leading rack of said contiguous row of racks to be pushed ahead for engagement by said rack advance conveyor, and for moving said latch means into rack-arresting position in time to arrest the next succeeding rack of said row of contiguous racks to prevent coasting thereof beyond said latch means.

13. An apparatus as set forth in claim 12, wherein said control means includes a cam operated by said rack-elevating conveyor to make one revolution per rack, and cam follower means carried by said latch engageable with a rack-releasing portion of said cam and a rack-arresting portion of said cam during each complete revolution of said cam.

14. In a product-treating apparatus provided with a treating chamber;

means for conducting a succession of product-supporting racks through said chamber in a closed loop;

said conducting means including pairs of laterally spaced longitudinally extending upper and lower rails for pendently supporting therebetween a row of contiguous racks;

said racks having at opposite sides thereof laterally projecting trunnions having rollers mounted thereof engaging said tracks for movably supporting said racks;

said conducting means also including an elevating conveyor at one end of said tracks for raising successive racks to said upper tracks, rack-advancing conveyor means at the end portions of said lower tracks adjacent said elevating conveyor for advancing successive racks thereto, and a rack conveyor having a vertical run portion for lowering successive racks to said lower tracks and a horizontal run portion for moving said successively lowered racks therealong to push said contiguous rows of racks ahead periodically through a distance of one rack space;

latch means pivotally mounted on said lower rails adjacent the rearward end of said rack-advancing conveyor for movement into and out of engagement with said rack trunnion rollers into rack-arresting and rack-releasing position; and control means operating in timed relation with said rack conveyor means for moving said latch means into rack-releasing position when said contiguous row of racks on said lower tracks is engaged by a rack advanced by said horizontal conveyor run portion to permit the leading rack of said contiguous row of racks to be moved into position for engagement by said rack advance conveyor, and for moving said latch means into rack-arresting position in time to arrest the next succeeding rack of said row of contiguous racks to prevent coasting thereof beyond said latch means.

* * * * *